No. 893,310. PATENTED JULY 14, 1908.
J. S. CROUCH.
PUMPKIN SEED ATTACHMENT FOR PLANTERS.
APPLICATION FILED JUNE 1, 1908.
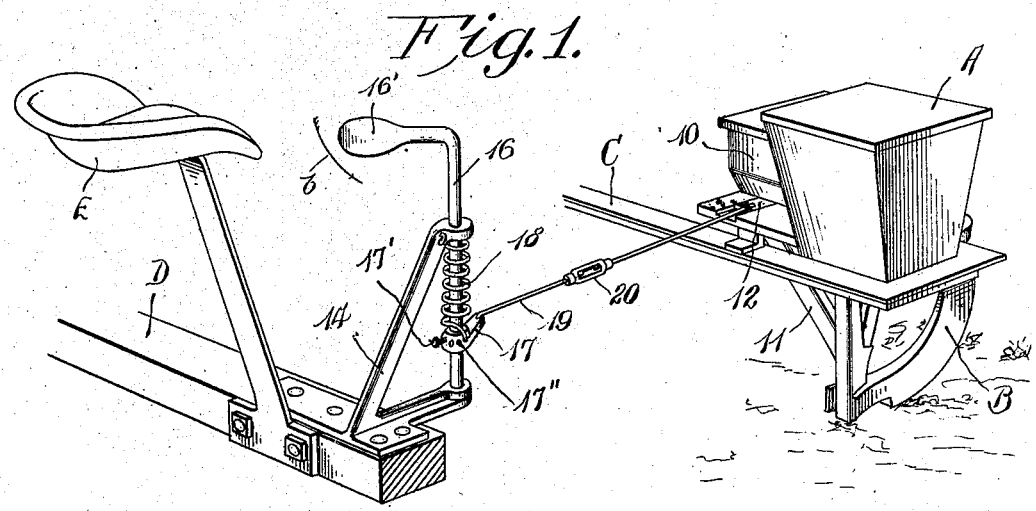
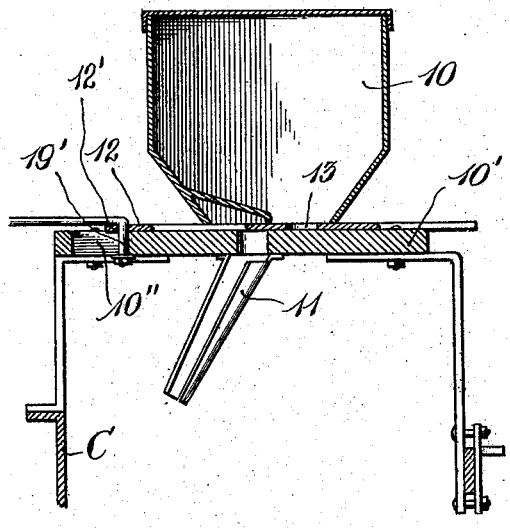
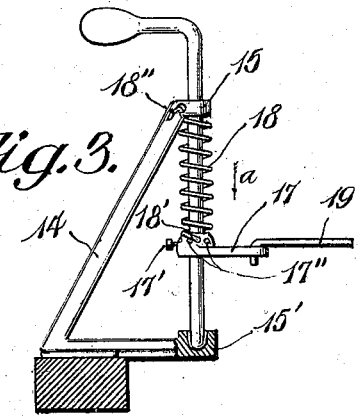
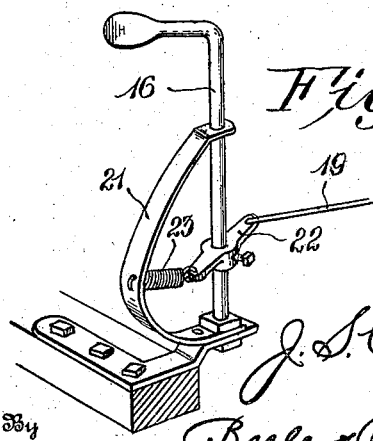
Witnesses
C. E. Smith.
S. E. Dodge.
Inventor
J. S. Crouch,
By Beeler & Cobb
Attorneys

UNITED STATES PATENT OFFICE.

JEFFERSON S. CROUCH, OF MANCHESTER, IOWA.

PUMPKIN-SEED ATTACHMENT FOR PLANTERS.

No. 893,310.

Specification of Letters Patent.

Patented July 14, 1908.

Application filed June 1, 1908. Serial No. 436,005.

*To all whom it may concern:*

Be it known that I, JEFFERSON S. CROUCH, a citizen of the United States, residing at Manchester, in the county of Delaware and State of Iowa, have invented certain new and useful Improvements in Pumpkin-Seed Attachments for Planters, of which the following is a specification.

This invention relates generally to corn planting machinery, and especially to auxiliary apparatus to be attached to various well known types of corn planters already in use or on the market whereby the driver on the planter to which one of these devices is applied may at will drop other kinds of seeds, such as pumpkin seeds, in the corn hills simultaneously with the regular dropping of the kernels of corn due to the usual automatic operation of the planter check-rower, or by whatever means may be employed for dropping or drilling the corn.

I am aware that it has heretofore been proposed to equip corn planters with auxiliary mechanism for depositing fertilizers and even seeds of various kinds together with the corn, but such devices so far as I am advised are operated automatically and continually by coöperation with the main mechanism of the planter, and hence are not under the immediate control of the driver, as should be the case in the satisfactory accomplishment of my purpose, it being appreciated that pumpkin seeds as a rule are desired to be planted only at certain portions or particularly fertile spots of the corn field.

This invention pertains to that type of devices set forth in my pending application filed Feb. 24, 1908, Ser. No. 417,495, and over which this is an improvement.

In order to obtain a full understanding of this present invention, including its construction, mode of assemblage, and characteristic advantages, reference is to be had to the following detail description and to the accompanying drawings, in which:

Figure 1 is a general perspective view of my invention shown as applied to a conventional type of corn planter; Fig. 2 is a vertical longitudinal sectional detail of the auxiliary seed box, Fig. 3 is a detail of the operating means, and Fig. 4 is a detail of a modified form of operating means.

Similar parts are referred to in this description and indicated on all of the views of the drawings by the same reference characters.

For the purpose of clear illustration I have shown portions of a corn planter, including a seed corn box A, a shoe or runner or furrow opener B, a support C, a frame member or axle D, and a driver's seat E. These parts, or their equivalents, are or may be of any suitable or approved makes, and in this connection I desire it to be distinctly understood that my invention may be applied to any well known type of corn planter without material alteration of either one or the other, and that while certain minor changes of form of the means for securing my invention in place may be necessitated to meet various requirements as to different types of planters, such changes are all to be comprehended within the actual scope of my invention as hereinafter specifically described and claimed.

Suitably located, as upon the support C and adjacent to the box A, is the auxiliary box 10 for pumpkin seed, or the like, and from the bottom of which a spout 11 leads to the corn channel of the runner B. A slide 12, having a seed hole 13, is movably mounted at the bottom of the box 10 upon a base 10'. The normal position of the slide 12 is such that the hole 13 communicates with the body of the seed contained in the box 10, but upon the slide being drawn outward the hole will register with the spout 11 and into which one or more seeds will be deposited in a well known manner. Said base 10' is provided with a slot 10'' beneath the slide 12.

In proximity to the driver's seat E and suitably positioned as for instance upon the frame member D is my operating mechanism for the slide 12. This mechanism in its preferred embodiment comprises a standard 14 secured rigidly in place and having a plurality of vertically alined bearings 15 and 15'. The standard may conveniently be formed of cast metal. A vertical lever 16 is journaled in the several alined bearings of the standard 14 and at its upper end has an angular extension 16' whereby the driver may by a lateral movement of his knee rotate the member 16 in one direction as indicated by the arrow *b*. An arm 17 is adjustably secured, as by a set screw 17', on the member 16 between said bearings. The hub of the arm is provided at any suitable or convenient points with a series of circumferentially arranged holes 17'', in any one of which is secured the lower end or hook 18' of a strong coil spring 18 and the upper end 18" of the spring is connected to the standard adjacent to the bearing 15. A rod 19 connects the arm with the slide and is provided with a turnbuckle 20 for purposes of adjustment. The front end of the rod 19 is provided with a downward extension 19' which passes through a hole 12' in the slide 12 and through the slot 10", whereby the slide is properly guided in its movements. A cotter may be employed, if desired, to hold the end 19' in place.

One normal tendency of the spring 18 is to rotate the lever 16 so as to keep or return the slide 12 to its normal position. At any time the driver may desire to drop pumpkin seed, he will, by a slight lateral movement of his knee, turn the lever 16 against the tension of the spring 18 to cause the arm 17 to draw the slide 12 outward. Another tendency of the spring 18 is to force the arm 17 downward with respect to the upper bearing 15, as indicated by the arrow $a$, whereby the lower end of the lever 16 is retained loosely seated in the bearing 15'. By virtue of the set screw 17' the arm 17 may be adjusted both circumferentially and vertically of the lever 16, as may be required, and more accurate adjustment of the arm with respect to the rod 19 may be effected by the use of the holes 17".

In the construction illustrated in Fig. 4, the lever 16 is journaled in a standard including a U-shaped yoke 21. In this form the arm 22 secured to the lever has two outwardly extending ends. A spring 23 is secured at one end to the yoke and at the other end to one end of the arm 22, the other end of the arm being connected to the slide 12 as before set forth.

Having thus described the invention, what is claimed as new, is:

1. The combination with a planter comprising the usual seed box and runner, of an auxiliary seed box, a spout leading from the latter box to said runner, a slide for delivering seed to said spout, and mechanism for operating said slide, said mechanism comprising a rigid standard having alined bearings, a knee-operated lever journaled in said bearings, an arm adjustably secured to said lever between said bearings, a spring secured at one end to the standard and at the other end to said arm to cause rotation of the lever in one direction, and a rigid connection between said arm and said slide, substantially as set forth.

2. The combination with a corn planter having the usual seed box A and the runner B, of an auxiliary seed box, a spout leading from said latter box to said runner, a seed slide at the bottom of said auxiliary box, a slotted base beneath said seed box, a rigid standard having vertically alined bearings, a knee-operated lever journaled in said bearings, an arm adjustably mounted on said lever between said bearings and being provided at its hub with a series of circumferentially arranged holes, a spring secured at one end to said standard and whose other end is provided with a hook to engage in any one of said series of holes, and a rigid connection between said arm and said slide, said connection passing through the slide and the aforesaid slot.

3. The combination with a corn planter comprising the usual seed box and runner, of an auxiliary seed box, a spout leading from the latter box to said runner, a slide for delivering seed to said spout, and mechanism for operating said slide, said mechanism comprising a rigid standard having a step bearing at its lower portion and an upper bearing vertically alined therewith, a knee-operated lever extending through said upper bearing and loosely seated at its lower end in said step bearing, an arm having a hub adjustably secured to said lever between said bearings, a spring coiled about the lever between the arm and the upper bearing, the spring being connected at one end to the standard adjacent to the upper bearing and to said arm and tending normally to rotate the shaft in one direction and to keep the lever seated in said step bearing, and connecting means between the arm and the said slide.

In testimony whereof I affix my signature in presence of two witnesses.

JEFFERSON S. CROUCH.

Witnesses:
FRANK CRAMER,
JOHN J. ARDUM.